United States Patent [19]

Fu et al.

[11] Patent Number: 5,592,752
[45] Date of Patent: *Jan. 14, 1997

[54] PROCESS AND AN APPARATUS FOR PRODUCING TEAS

[75] Inventors: Ya-ming Fu; Jyi-Ching Perng; Chen-Une Hwong; Liang-Jyi Fang, all of Hsinchu, Taiwan

[73] Assignee: Industrial Technology Research Institute, Hsinchu, Taiwan

[ * ] Notice: The term of this patent shall not extend beyond the expiration date of Pat. No. 5,433,019.

[21] Appl. No.: 481,117

[22] Filed: Jun. 7, 1995

Related U.S. Application Data

[62] Division of Ser. No. 60,146, May 13, 1993, Pat. No. 5,433,019.

[51] Int. Cl.⁶ ............................................. A23F 3/16
[52] U.S. Cl. ................... 34/388; 34/471; 34/475
[58] Field of Search ............................ 34/388, 471, 474, 34/475

[56] References Cited

U.S. PATENT DOCUMENTS

| | | | |
|---|---|---|---|
| 1,581,803 | 4/1926 | Hulbert | 34/475 |
| 4,051,264 | 9/1977 | Sanderson et al. | 426/52 |
| 4,203,358 | 5/1980 | Vogt | 34/133 |
| 4,389,422 | 6/1983 | Hudak | 34/9 |
| 4,526,796 | 7/1985 | Ashikawa | 34/133 |
| 4,880,656 | 11/1989 | Schutz et al. | 426/386 |
| 5,433,019 | 7/1995 | Fu et al. | 34/78 X |

*Primary Examiner*—Edward K. Look
*Assistant Examiner*—Michael S. Lee
*Attorney, Agent, or Firm*—W. Wayne Liauh

[57] ABSTRACT

A process for producing a flavor-rich tea from tea leaves is disclosed. It comprises the steps of: (a) plucking the tea leaves; (b) withering the tea leaves; (c) rolling the tea leaves; and (d) drying the tea leaves in a drying apparatus in a circulating air at a drying temperature in the range of from about 30° C. to less than about 80° C. while maintaining a relative humidity of the circulating air in the range about 1% to 30%, the drying apparatus comprising a dehumidifying device for dehumidifying air, a temperature-moisture controlling device, and a drying room. The tea made from this process is capable of being subsequently stored at room temperature and substantially retains flavor-producing volatile constituents. Optionally, the tea leaves after step (d) can be baked for a short time to produce a roasted flavor.

10 Claims, 4 Drawing Sheets

PROCESS AND AN APPARATUS FOR PRODUCING TEAS

This application is a divisional of Ser. No. 08/060,146, filed May 13, 1993, now U.S. Pat. No. 5,433,019.

FIELD OF THE INVENTION

The present invention relates to a process for producing teas at low temperature and low humidity, and an apparatus for achieving this process.

BACKGROUND OF THE INVENTION

Conventional process for producing teas includes: plucking, withering, rolling, and panning. After that, teas are dried at a relatively high temperature, and the moisture content of teas is reduced to about 4% dry base moisture content. Consequently, teas can be stored for a long period without impairing their quality.

In such a drying process, air is generally heated by burning oil or gas, or by some electrical heating device. Hot air, between about 90° C. to 150° C., is guided to the surface of tea leaves. Then the moisture of the tea leaves is removed, and the teas are dried for storage.

The flavors of teas are produced during the withering process. Once the withering process is completed, the flavors dissipate under high temperature in the later drying processes. These flavors include polyphenol, aldehyde, ether, pyrabine, etc. Thus, the high temperature drying process is the major cause of volatile flavors loss. From another point of view: the flavors of teas when we are drinking are not as rich as the flavors of those teas in the production process.

In order to reduce the loss of volatile flavors, another process for producing "frozen fresh tea" has been used. In this process, the half-product of tea (after rolling) is not dried under high temperature. Instead, it is stored in refrigerators when its moisture content is high (at about 60 to 130% dry base moisture content). Under a relative low temperature (below 15° C.), the residual enzyme is inhibited, and the teas are kept fresh so as to preserve their qualities and flavors.

Because there is no high temperature drying process, some volatile flavors are retained in the "frozen fresh tea". These flavors spread out while steeping the tea, which impress drinkers with exotic olfactory experiences. However, such progress in retaining flavor quality results at great cost from keeping the teas in refrigerators. If they are not stored in refrigerators, without low temperature inhibition the residual enzyme in the teas will rapidly react to impair the qualities of the teas under a room temperature and a relatively high moisture content.

It is very clear that although the "frozen fresh tea" preserves more volatile flavors and a constant quality, it requires refrigeration and the storage cost is significantly increased.

In addition to the aforementioned flavor keeping and storage problems, except for temperature atmospheric conditions (including moisture) are not controllable in the conventional tea producing process. Air can be heated in order to reduce the relative humidity. Among all factors, atmospheric humidity is most important. In a moist atmosphere (high relative humidity), tea leaves need more time in contact with the hot air to dry, resulting in the flavors loss. For this reason, in some regions where atmosphere humidity varies over a larger range, whether or not tea-makers produce teas depends on the weather.

SUMMARY OF THE INVENTION

An object of the present invention is to provide a process for producing teas that is capable of preserving volatile flavors and being stored in room temperature. In this process, tea leaves is dried at low temperature and low humidity.

The main steps of the present invention include:
(a) plucking the tea leaves;
(b) withering the tea leaves;
(c) rolling the tea leaves; and
(d) drying the tea leaves, wherein the range of drying temperature is about 30° C. to 80° C., and the range of humidity is about 1% to 30% RH.

Another object of the present invention is to provide an apparatus for achieving this process, which is substantially composed of:
a dehumidifying device for dehumidifying air;
a temperature-moisture controlling device for respectively regulating air temperature and humidity to predetermined values; and
a drying room, wherein the tea leaves are placed in said drying room, air is dehydrated in said dehumidifying device, then guided into said temperature-moisture controlling device where the temperature and humidity of air are respectively regulated to predetermined values, and then forced to flow through said drying room in order to dry the tea leaves, and guided back into said dehumidifying device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

The present invention will become more fully understood from the detailed description given hereinbelow and the accompanying drawings which are give by way of illustration only, and thus are not limitative of the present invention and wherein.

DETAILED DESCRIPTION OF THE PREFERRED EMBODIMENT

Figure 1:
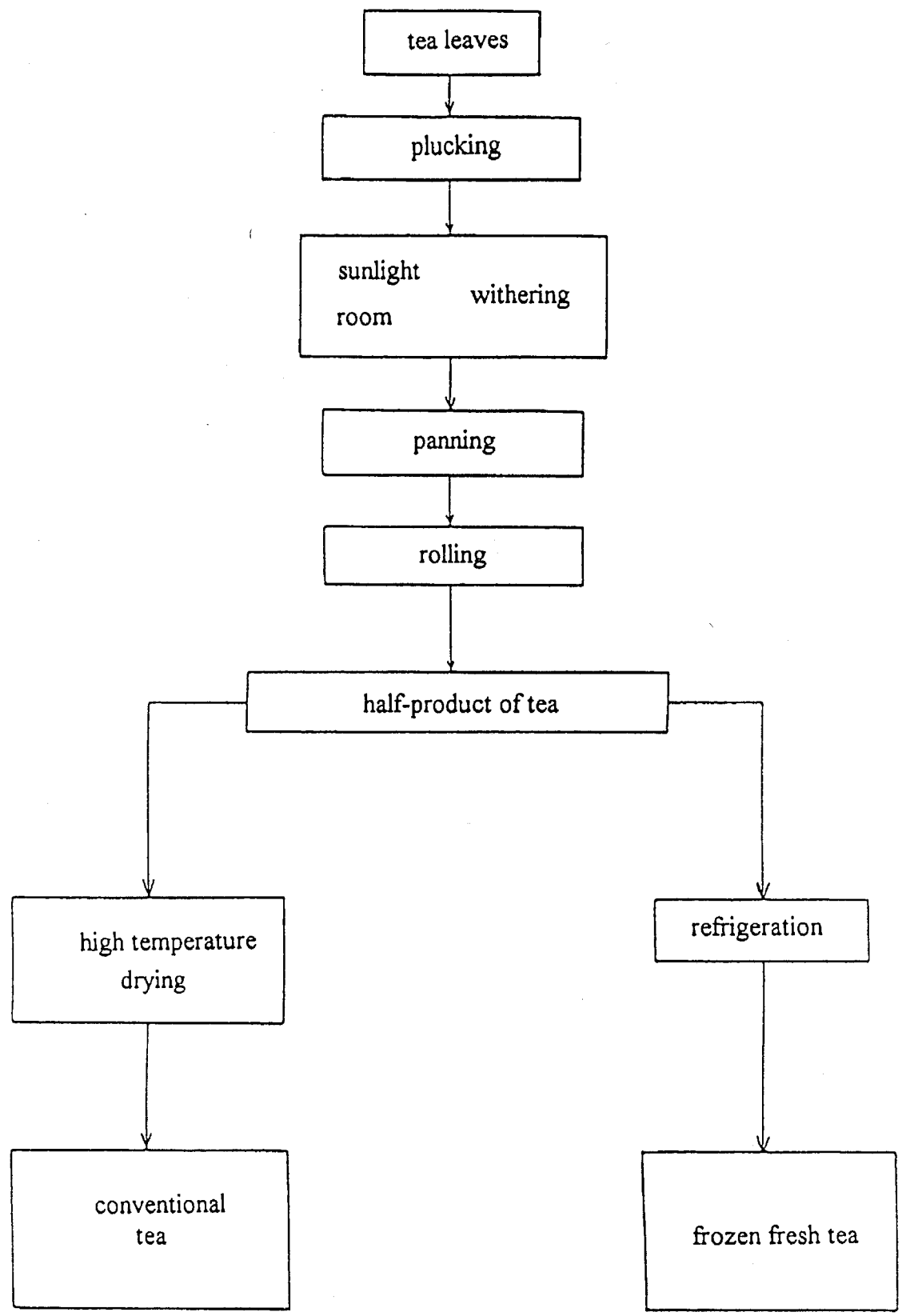
FIG. 1 represents two processes for producing teas nowadays.
Figure 2:
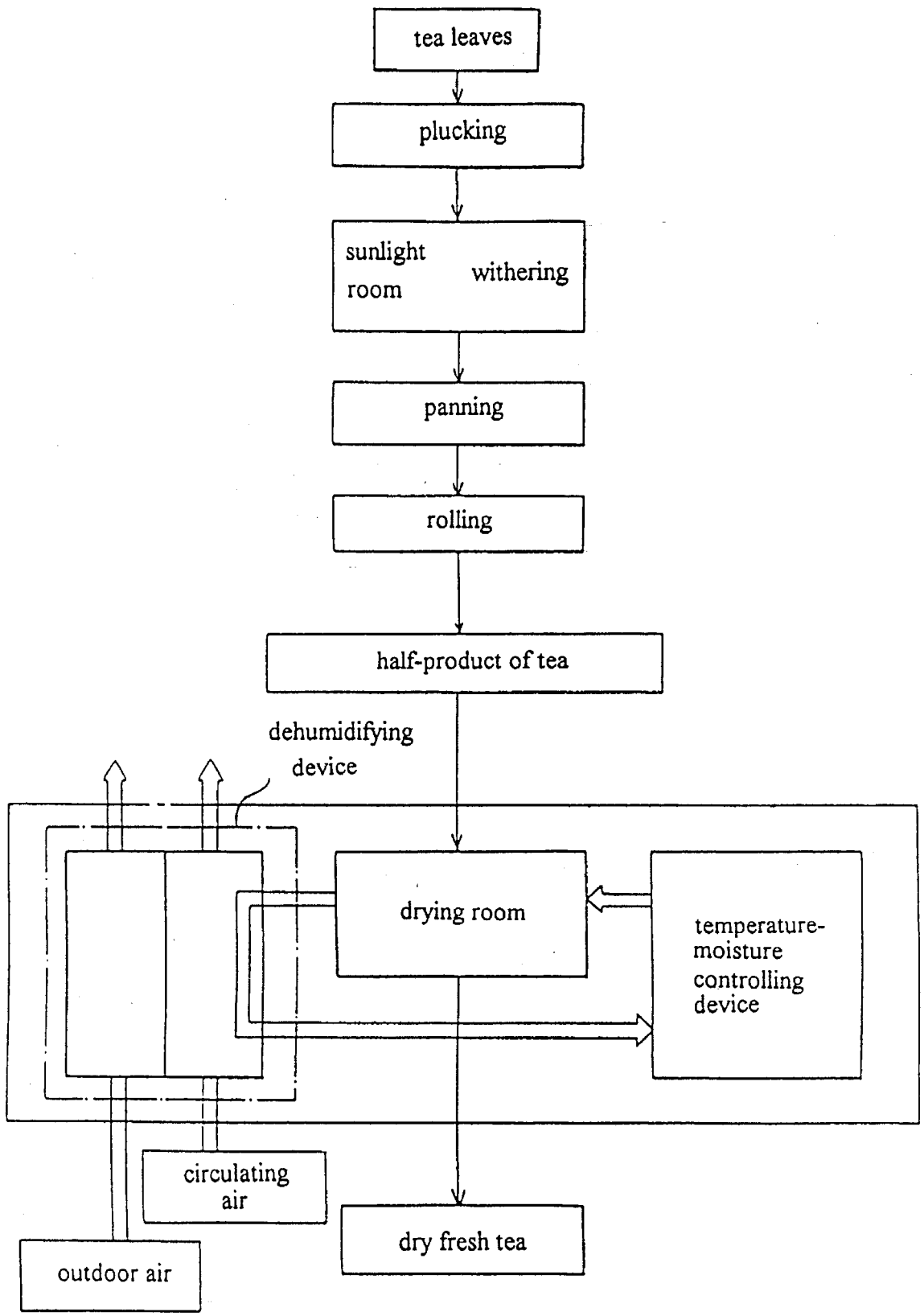
FIG. 2 represents the process for producing "dry fresh tea" according to the present invention.

FIG. 2 represents the process for producing teas according to the present invention. The present invention replaces the high temperature drying process in the conventional tea producing process with a low temperature drying process. In the low temperature drying process, air flows through a dehumidifying device and a temperature-moisture controlling device, then comes in contact with tea leaves for drying tea leaves at a low temperature (or room temperature) within a controlled humidity range. Therefore, this process maintains the original shape of tea leaves and retains more flavors. In fact, the tea produced from the process according to the present invention should be considered a new kind of tea. This kind of tea may be named a "dry fresh tea".

Figure 3:
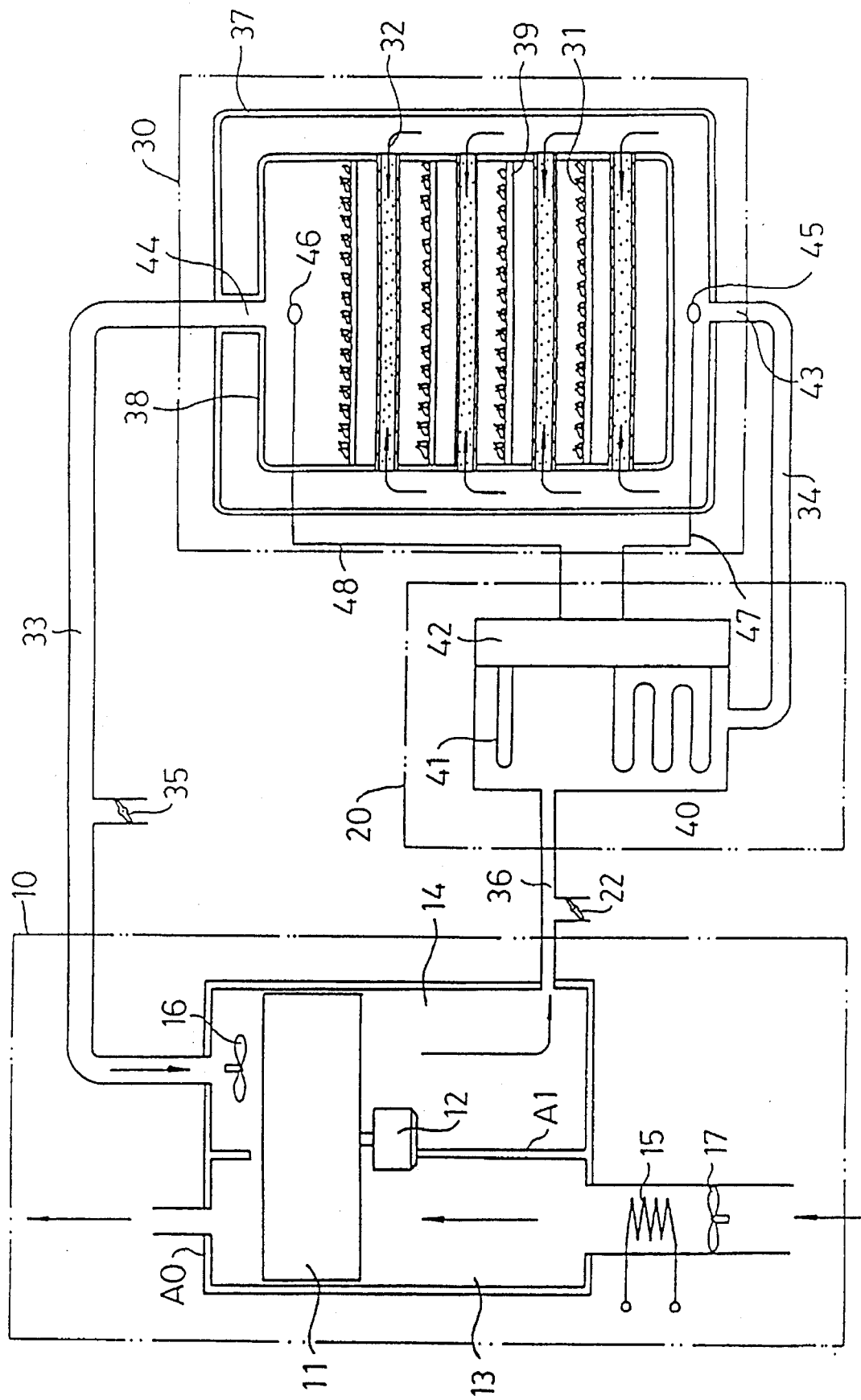
FIG. 3 shows an apparatus for drying teas at low temperature according to the present invention.

FIG. 3 shows an apparatus for drying teas at low temperature according to the present invention. There are three elements including a dehumidifying device 10, a temperature-moisture controlling device 20, and a drying room 30, which form a limited open cycle system and will be respectively described hereinafter.

Dehumidifying device 10 comprises a substantially cylindrical shell A0 having a partition plate A1, a dehydrating drum 11, a motor 12, an electrical heater 15, and two fans 16, 17. The shell A0 is provided with at least two openings at each end. The inner portion of the shell A0 is divided into a first tunnel 13 and a second tunnel 14 by the partition plate A1. The dehydrating drum 11 is enclosed in the shell A0. The outer diameter of dehydrating drum 11 is a little smaller than the inner diameter of shell A0. Dehydrating drum 11 is filled with adsorbents like silica gel. Circulating air is forced to flow through the second tunnel 14 by the fan 16 and is then dehydrated. The electrical heater 15 is disposed at an opening of the first tunnel 13 of shell A0. Fan 17 is disposed at the upstream of the heater 15. Outside air is forced by fan 17 to flow through the heater 15 and then the dehydrating drum 11 in the first tunnel 13. Moisture adsorbed by the adsorbents will be evaporated by the heated outside air.

Temperature-moisture controlling device 20 can be a conventional temperature-moisture controlling device which comprises an electrical heater 40, a humidifier 41, and a feedback controlling device 42 for controlling the heater 40 and the humidifier 41. A pipe 36 communicates the second tunnel 14 and the temperature-moisture controlling device 20. A relief valve 22 is disposed on pipe 36. Another pipe 34 communicates the temperature-moisture controlling device 20 and the drying room 30.

Drying room 30 comprises an outer shell 37 and an inner shell 38 and a plurality of gas permeable plates 39 and a plurality of tubes 32. Gas permeable plates 39 are horizontally disposed in the inner shell 38. A plurality of tubes 32 having venting holes provided thereon are horizontally disposed between the gas permeable plates 39. At the bottom of the outer shell 37, an air inlet 43 is provided for communicating with temperature-moisture controlling device 20 through pipe 34. At the top of the inner shell 38, an air outlet 44 is provided for communicating with dehumidifying device 10 through pipe 33. Two sensors 45, 46 for sensing the temperature and moisture of the circulating air are respectively disposed nearby the inlet 43 and the outlet 44. Two wires 47, 48 electrically connect the sensors 45, 46 to the feedback controlling device 42. Pipe 33 communicates drying room 30 and dehumidifying device 10. An inlet valve 35 is disposed on pipe 33.

In operation, circulating air is dehydrated by the dehydrating drum 11 and then is guided into temperature-moisture controlling device 20 through pipe 36. After the circulating air flows through the temperature-moisture controlling device 20, the temperature and moisture of the circulating air are respectively regulated to the predetermined values as will be discussed hereinafter.

In consequence, circulating air is guided into drying room 30 through pipe 34. Sensor 45 detects the temperature and moisture of the circulating air and sends these data to the feedback controlling device 42 via wire 47. Circulating air flows into tubes 32, and flows, through gas permeable plates 39 in an upward direction for drying teas 31, then exits drying room 30 from air outlet 44. Sensor 46 detects the temperature and moisture of circulating air and sends these data to the feedback controlling device 42 via wire 48. Finally, circulating air goes back to the second tunnel 14 by way of pipe 33 and begins another cycle.

The temperature-moisture controlling device 20 receives the data from sensors 45, 46. After calculation, temperature-moisture controlling device 20 directs the electrical heater 40 to heat the circulating air to a predetermined temperature and directs the humidifier 41 to spray a proper amount of water so as to lift up the humidity of the circulating air to a predetermined humidity.

It is to be noted that, all three elements including the dehumidifying device 10, the temperature-moisture controlling device 20, and the drying room 30 are respectively commercially available. There may be equivalent devices different to the devices described hereinbefore.

Valves 22, 35 can be manually or automatically controlled. When valve 22 is opened, excess air in the system can be released into the atmosphere. When valve 35 is opened, a controlled amount of fresh air can be sucked into the system to replace odoriferous (odorized) air.

The preferred temperature range of circulating air is about 30° C. to 80° C. The preferred humidity range of circulating air is about 1% RH to 30% RH (relative humidity). It should be noted that tea leaves will crack when the temperature is too high or the moisture is too low. Also, at a high humidity a much longer drying time is required, which increases cost.

According to inventor's experience, the volatile flavors of teas will not dissipate in the drying process at a temperature under 80° C., and the scents of different kinds of teas will be retained. Consequently, the quality of teas is improved in this preferred temperature range.

The qualities of teas which are dried at about 80° C., 90° C. and 120° C. in experiments are listed below:

TABLE 1

|  | about 80° C. | about 90° C. | above 120° C. |
| --- | --- | --- | --- |
| color of liquor | clear and green | orange yellow | orange red |
| appearance | fresh green | slightly dim | lusterless |
| flavor | delicate fragrant | mellow | odor of charring |
| infused leaves | good | fair | hardly stretched |

In this experiment, the tea dried at about 80° C. has the best quality, the tea dried at about 90° C. has a fair quality, and the quality of the tea dried at above 120° C. is the worst.

Figure 4:
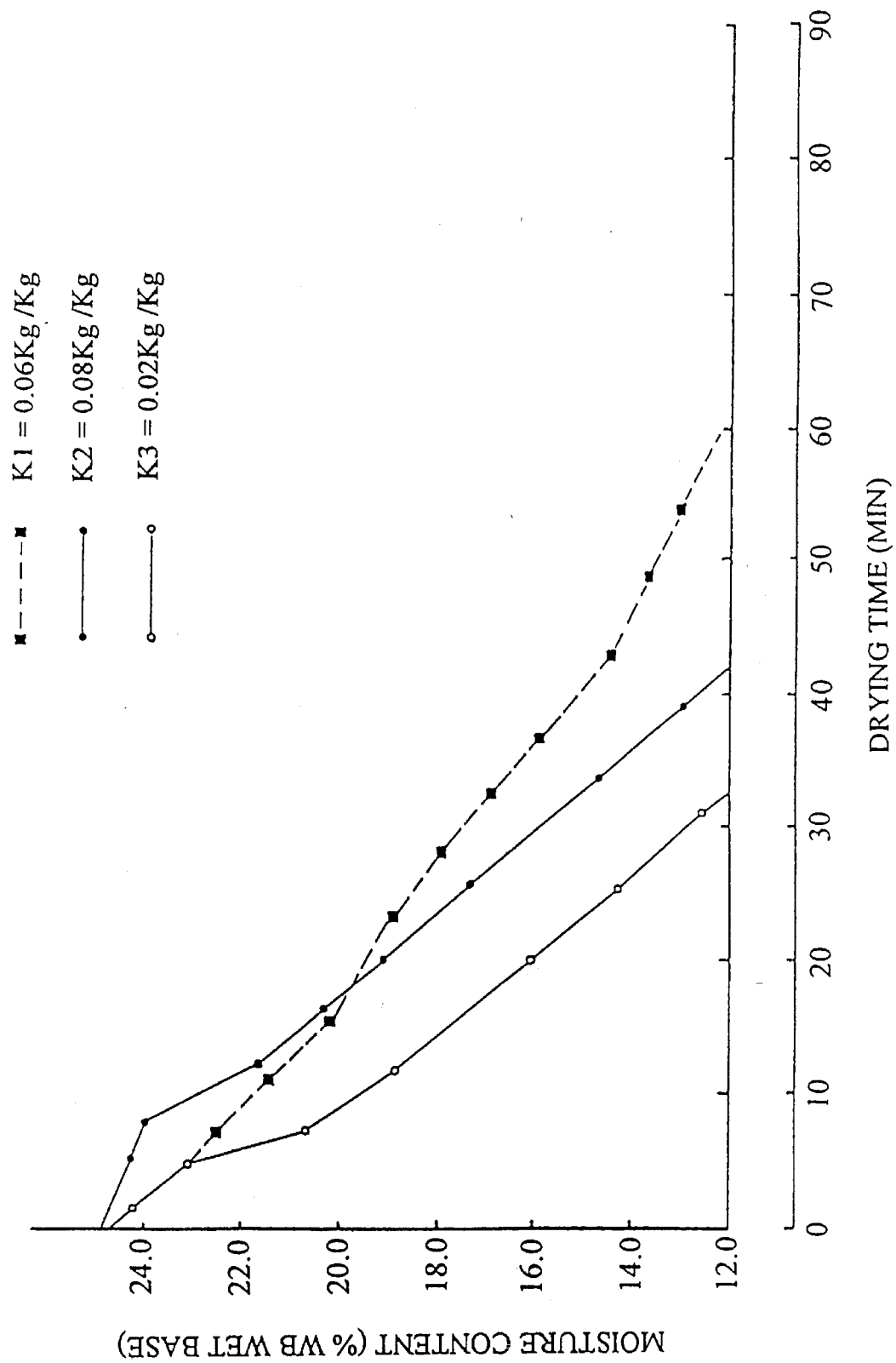
FIG. 4 shows a graph indicating the result of a drying experiment.

An experiment at constant temperature (about 80° C.) demonstrates the influence of humidity on drying time. FIG. 4 shows the result of this experiment. It is found that the drying time is more than 40 minutes when the absolute humidity H is 0.06 kg/kg air or 0.08 kg/kg air. It takes 30 minutes to dry teas when absolute humidity H is 0.02 kg/kg air. There seems to be a trend that: the lower the absolute humidity of circulating air, the less the time required to dry the tea.

Another example supports this conclusion:

When the atmosphere is at 30° C. and 80% RH (relative humidity), it spends more than 150 minutes to complete the drying process by a conventional type tea dryer using 80° C. circulating air. The apparatus according to the present invention takes only 60 minutes to finish the drying process. Thus, the conventional process takes too much time to dry teas under 80° C. for retaining the volatile flavors. On the contrary, the process according to the present invention is more practical.

Furthermore, because the conventional drying process takes much more time than the process according to the present invention, the amount of volatile flavors loss is greater in conventional drying process. Therefore, the quality of flavors of teas using the process according to o the present invention will be much better than the quality of flavors of teas using the conventional drying process.

After the above-mentioned drying process, teas can be baked for a short period in order to produce an effect of roasted flavor, if such an effect is desired. Because the moisture content of tea leaves before baking is under 4%, that is, tea leaves are in a condition of monolayer moisture content, the baking process will not cause too much loss of volatile flavors. Therefore, the present invention fulfills another primary object: to retain flavors, to produce desired effects, but to reduce undesirable effects.

As stated above, volatile flavors will dissipate at a temperature above 80° C. in drying. The conventional drying process takes a long time for drying teas under 80° C. As a result, teas will ferment, thus impairing their quality. In addition, the cost of producing teas is increased. However, the present invention shortens the time in drying teas while preserving more flavors in the tea. Thus, the quality of teas is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a flavor-rich tea from tea leaves, said process comprising the steps of:
    (a) plucking the tea leaves;
    (b) withering the tea leaves;
    (c) rolling the tea leaves; and
    (d) drying the tea leaves in a drying apparatus in a circulating air at a drying temperature in the range of from about 30° C. to less than about 80° C. while maintaining a relative humidity of the circulating air in the range about 1% to 30%, said drying apparatus comprising a dehumidifying device for dehumidifying air, a temperature-moisture controlling device, and a drying room;
    (e) wherein said tea is capable of being subsequently stored at room temperature and substantially retains flavor-producing volatile constituents.

2. A process for producing a flavor-rich tea from tea leaves according to claim 1 wherein:
    (a) said dehumidifying device includes a rotatable dehydrating drum; and
    (b) said temperature-moisture controlling device is capable of regulating air temperature to within a range from about 30° C. to about 80° C. and the humidity of the air to within a range from about 1% RH to about 30% RH.

3. A process for producing a flavor-rich tea from tea leaves according to claim 1 wherein the step of drying the tea leaves comprises the following sub-steps:
    (a) placing the tea leaves in said drying room;
    (b) dehydrating air in said dehumidifying device;
    (c) directing the dehydrated air to said temperature-moisture controlling device where the temperature and humidity of the air are respectively regulated;
    (d) causing the regulated air to flow through said drying room to thereby dry the tea leaves; and
    (e) guiding back air from step (d) into said dehumidifying device.

4. A process for producing a flavor-rich tea from tea leaves according to claim 3 wherein the steps of (a) through (e) are repeated until the moisture content of the tea leaves is under 4%.

5. A process for producing a flavor-rich tea from tea leaves according to claim 1 which further comprises a step of baking the tea leaves after step (d) for a short time to produce a roasted flavor.

6. A flavor-rich tea produced from a process which comprises the steps of:
    (a) obtaining tea leaves;
    (a) plucking the tea leaves;
    (b) withering the tea leaves;
    (c) rolling the tea leaves; and
    (d) drying the tea leaves in a drying apparatus in a circulating air at a drying temperature in the range of from about 30° C. to less than about 80° C. while maintaining a relative humidity of the circulating air in the range about 1% to 30%, said drying apparatus comprising a dehumidifying device for dehumidifying air, a temperature-moisture controlling device, and a drying room;
    (e) wherein said tea is capable of being subsequently stored at room temperature and substantially retains flavor-producing volatile constituents.

7. A flavor-rich tea according to claim 6 wherein:
    (a) said dehumidifying device includes a rotatable dehydrating drum; and
    (b) said temperature-moisture controlling device is capable of regulating air temperature to within a range from about 30° C. to about 80° C. and the humidity of the air to within a range from about 1% RH to about 30% RH.

8. A flavor-rich tea according to claim 6 wherein the step of drying the tea leaves comprises the following sub-steps:
    (a) placing the tea leaves in said drying room;
    (b) dehydrating air in said dehumidifying device;
    (c) directing the dehydrated air to said temperature-moisture controlling device where the temperature and humidity of the air are respectively regulated;
    (d) causing the regulated air to flow through said drying room to thereby dry the tea leaves; and
    (e) guiding back air from step (d) into said dehumidifying device.

9. A flavor-rich tea according to claim 8 wherein the steps of (a) through (e) are repeated until the moisture content of the tea leaves is under 4%.

10. A flavor-rich tea from tea leaves according to claim 6 wherein the process for producing said flavor-rich tea further comprises a step of baking the tea leaves after step (d) for a short time to produce a roasted flavor.

* * * * *